May 18, 1937.   W. F. FRIEDMAN   2,080,416
MESSAGE AUTHENTICATING SYSTEM
Filed June 26, 1935   4 Sheets-Sheet 2
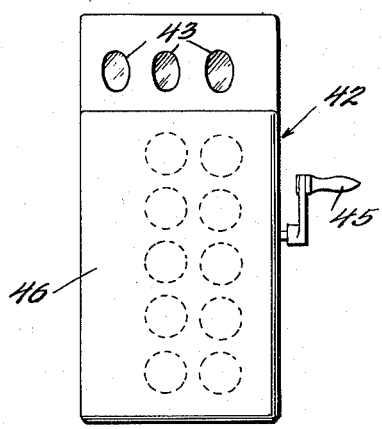
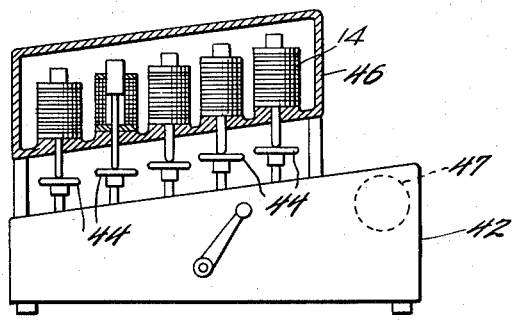
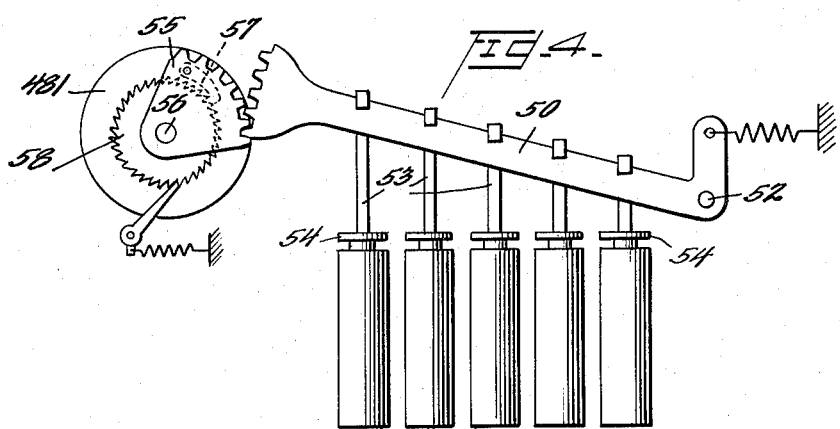
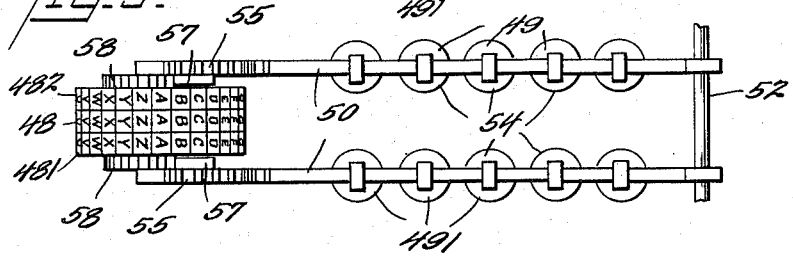
Inventor
William F. Friedman
Robert A. Laughlin
Charles A. Rowe
By
Attorney May 18, 1937. W. F. FRIEDMAN 2,080,416
MESSAGE AUTHENTICATING SYSTEM
Filed June 26, 1935 4 Sheets-Sheet 3
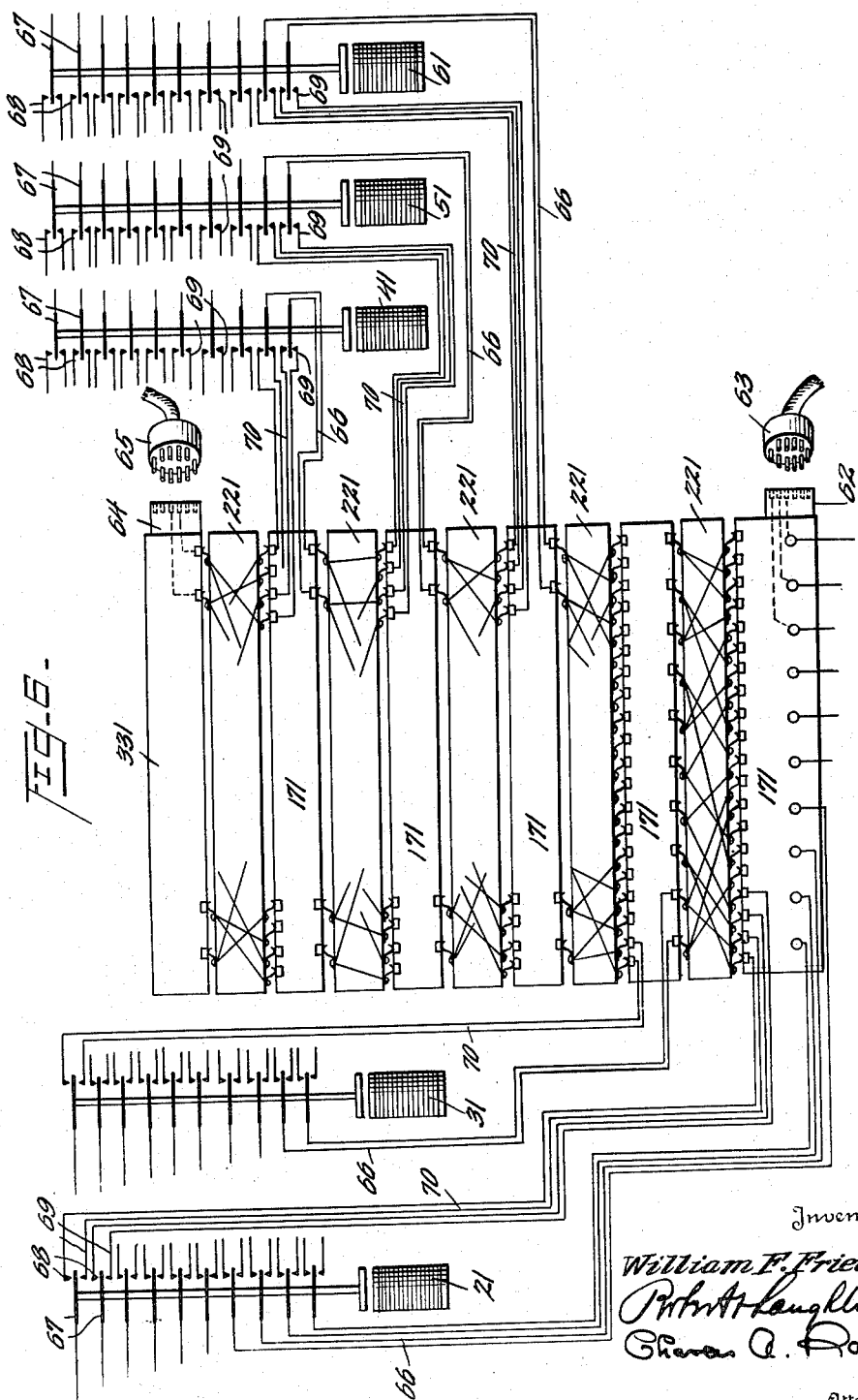

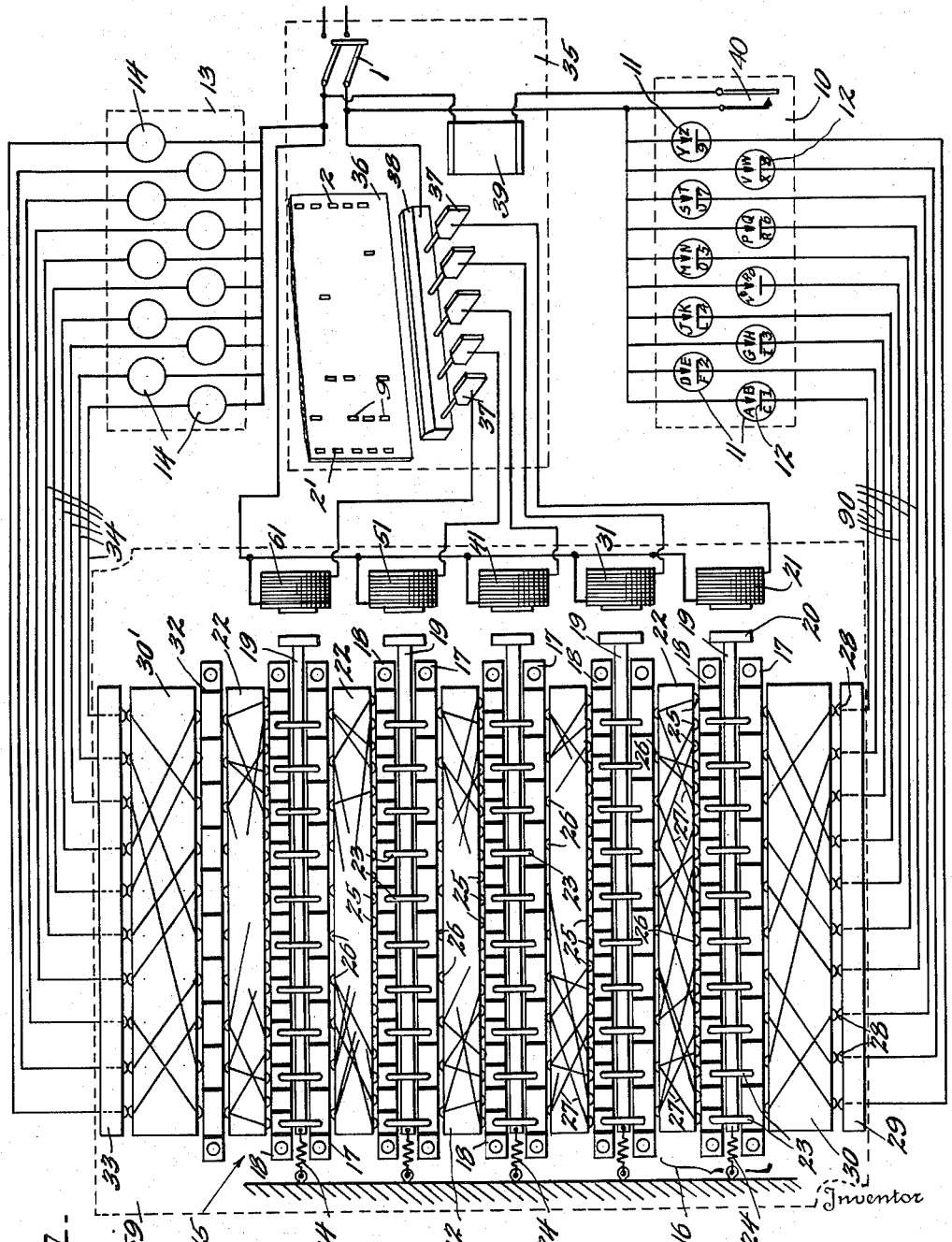

May 18, 1937. W. F. FRIEDMAN 2,080,416
MESSAGE AUTHENTICATING SYSTEM
Filed June 26, 1935 4 Sheets-Sheet 4
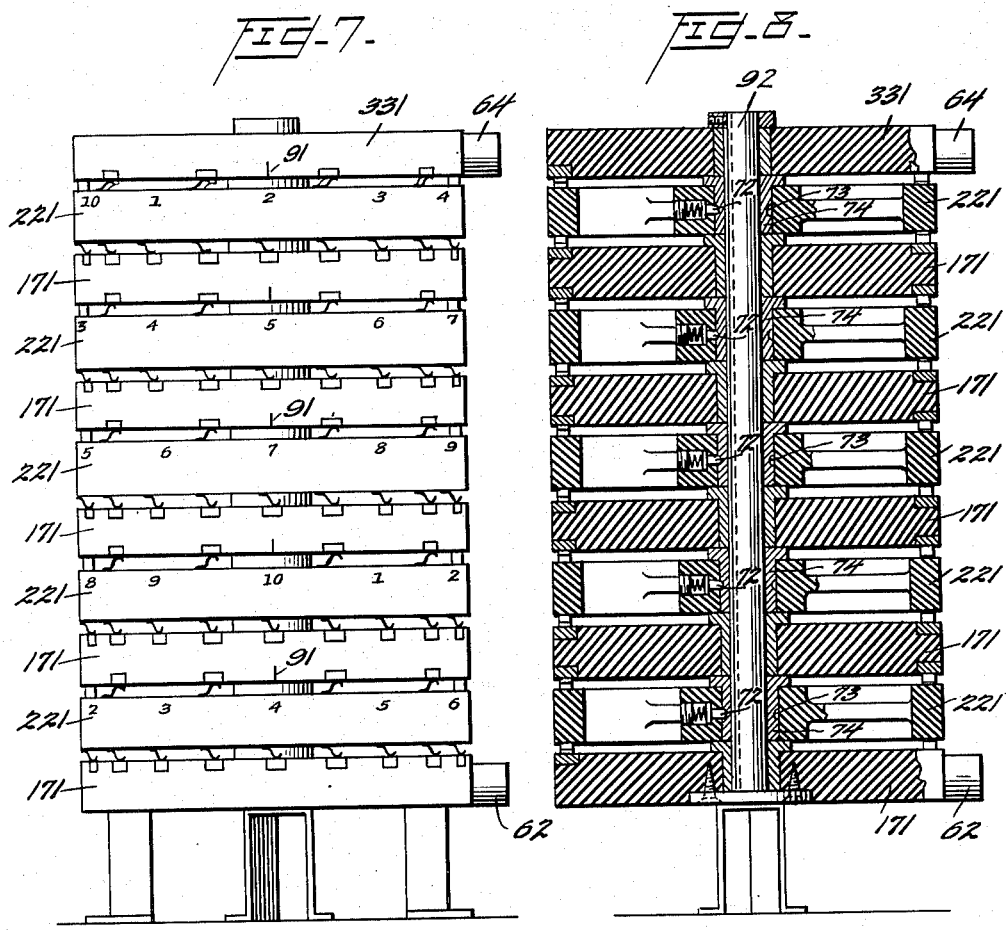
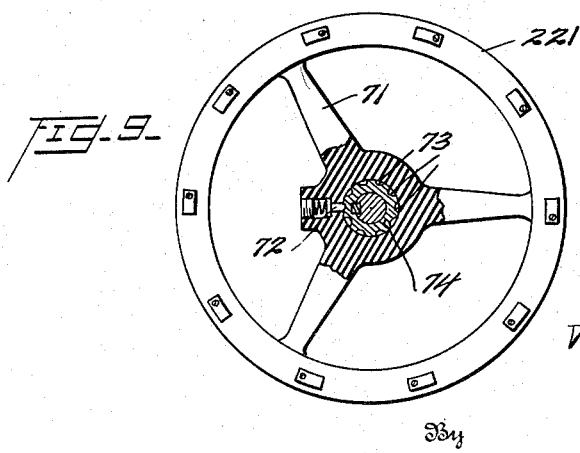
Inventor
William F. Friedman
Robert A. Laughlin
Charles A. Rowe
By
Attorney Patented May 18, 1937

2,080,416

UNITED STATES PATENT OFFICE 2,080,416

MESSAGE AUTHENTICATING SYSTEM

William F. Friedman, Washington, D. C.

Application June 26, 1935, Serial No. 28,500

43 Claims. (Cl. 35—4)

(Granted under the act of March 3, 1883, as amended April 30, 1928; 370 O. G. 757)

The invention described herein may be manufactured and used by or for the Government for governmental purposes, without the payment to me of any royalty thereon.

The system and apparatus disclosed and claimed in the present application are more particularly designed for use by banks or other organizations which are in frequent electrical communication with each other and where it is important that the recipient of a message should have a means of checking the accuracy and authenticity of the message. It will be readily appreciated that this is of particular importance to banks which have occasion to communicate with each other telegraphically and which order each other to pay or credit large amounts of moneys to certain specified persons. The present system and apparatus, therefore, are designed to provide a test for each message transmitted and which may be employed by the transmitter and receiver of the message as a means for testing the authenticity of the message and its contents, the same test also serving as a means for detecting possible serious errors made in the preparation of the message or in the course of its transmission by any agency of telecommunication.

More particularly, the present system and apparatus, which are herein designated a message authenticating system and apparatus, are designed to provide the sender with a test consisting of a combination of figures or of letters of the alphabet which combination is transmitted with and as a part of the message. In the art, such a combination of figures or letters, or both, is termed a "test", "test group", "test word", "check word", or "control word". In what follows, I shall, for the sake of brevity, use merely the word "test" for this purpose, it being understood that the test may consist of figures, or letters, or both. The bank receiving this message being also provided with the system and apparatus disclosed herein then operates the present system and apparatus and if as a result of such operation the system and apparatus yield the same test, the authenticity of the message and its accuracy are assured. If, on the other hand, the receiver of the message upon operation of the present system obtains a different indicated test from that which accompanied the message, the receiver then knows that the message either lacks authenticity, or that an error was made in the preparation of the message, or that a serious error was committed in its transmission by the telecommunication agency.

Another phase of the present system and apparatus is that the exact nature or form of the test which the present system and apparatus yields for any particular message cannot be foretold by the test clerk or operator of the system and apparatus. Moreover, in the present system devices are employed whereby the authentic transmission of the same message twice on the same day will, nevertheless, result in two different tests and the test obtained is unique to each message. It will be seen, therefore, that by means of the present system and apparatus the opportunity for fraud is eliminated.

In addition to affording means for testing telegraphic money transfers, the present system and apparatus may also be employed in connection with the authentication of letters of credit, checks, money orders, or any other type of document in which some indication of authenticity is highly desirable or necessary.

Another use of the present system and apparatus is in connection with the authentication of telephonic, telautographic, or other electrical telecommunications between a central bank and its branches located in the same city. For example, if a large bank A, has several branches B, C, D, . . . , in the same city, and if a customer presents for payment a check for a large amount at branch B, it is essential that the paying teller at B assure himself that the customer actually has to his credit a sum sufficient to cover the amount of the withdrawal. Such assurance at present usually takes the form of a telautographic inquiry from B to A, with a reply from A to B; for authenticity, the bank has heretofore relied upon the appearance of the telautographic "handwriting". But it is well known that such a test of authenticity is not safe, since the correspondence between the original handwriting and the telautographic record is only approximate and forgery is quite easy for anybody having access to the line over which the telautographic messages are exchanged. The present system and apparatus can readily be employed for the purpose of imparting authenticity to these inquiries and replies exchanged between the central bank and its branches.

The present system embodies a keyboard, character indicating means, and devices operatively disposed between the keyboard and the indicating means whereby spelling out the message data on the keyboard will result in the operation of the character indicating means in such a manner as to indicate a test for the message data in the form of a limited number of characters. The keyboard may be the conventional manually operable typewriter keyboard, or it may be of any suitable type operable by any well known devices. By "spelling out the message data" is meant the ordinary process of punching or striking or otherwise operating the keys of the keyboard corresponding to the data for which the test is desired. The data obviously may include letters of the alphabet as well as digits or the like.

The system shown herein embodies a keyboard and a group of character wheels operated by such keyboard. While, if desired, the keyboard may be the normal typewriter keyboard, for the purpose of simplifying the present apparatus, the number of keys may be substantially reduced and may be as low as ten in number, each key corresponding to a digit from zero to 9 and also corresponding to two or three letters of the alphabet. The number of character wheels operated by the keys need not be more than two or three, although it will be understood that any suitable number of such wheels may be employed. The wheels may be the ordinary digit wheels, each bearing digits from zero to 9 and may essentially operate in the same manner as the digit wheels of an adding machine of the type commonly called a comptometer. It is preferred, however, to have the character wheels bear on their circumferential faces the letters of the alphabet instead of digits so that the test obtained may be a combination or group of letters of the alphabet.

In the preferred form of the invention disclosed herein three such wheels are shown, these being organized in a well known manner whereby the complete revolution of one wheel is transferred to a fractional revolution of the adjacent wheel. In the present system employing three such wheels, only two of these wheels may be operated directly by the keys.

The general operation of the system and apparatus will now be described in connection with a message assumed to be one that is commonly termed a "payment message". In operation when such a message is written and before it is transmitted, the data forming the basis of the test, hereinafter termed the "test data", are transcribed on the keyboard. The test data may comprise certain of the items contained in the message, such as proper names, amounts of money, kind of monetary unit, etc. The result of operating the keyboard in transcribing the test data is that the indicator or character wheels are operated responsively to each key operation, and these wheel operations are cumulative so that when the test data have been completely transcribed, a three-letter or three-digit indication is obtained which in a sense represents a value sum or total value of the test data. This three-letter or three-digit test is transmitted with the message together with another one- or two-letter indication which will be referred to hereinafter.

In the present system the key operations are transmitted to the indicator wheels by means of electrical devices. It will be understood, however, that the present application is not limited to such devices and other and equivalent devices may be employed to accomplish the same purpose.

One feature of the present system is that the means or devices interposed between the keys and the indicator wheels for translating a key operation into a fractional rotation of an indicator or character wheel are so organized that the specific angular rotation of a wheel in response to the operation of a key varies from time to time. The device or devices for accomplishing this end will herein be termed a "randomizer". The randomizer comprises two cooperating instrumentalities contributing to the end result of rendering the test unpredictable. One of these instrumentalities comprises adjustable or interchangeable randomizing elements which may be set or adjusted from time to time, such as daily or weekly, and thereby change the correspondence between the keys and the translating devices so that the operation of the same key of the keyboard results in an entirely different operation of an indicator or character wheel with a change of such setting. This device is preferably under the control of a trusted officer of the bank or other organization and the setting is made by him and may be exclusively within his knowledge. Cooperating with this instrumentality of periodically varying the randomizer is a device operating aperiodically and which alters the correspondence between the translating devices and the keys at each operation of a key of the keyboard. This device is preferably in the form of an electrical sensing apparatus which is controlled by a punched card or the like. It will be understood, however, that one of these instrumentalities may be used without the other if desired.

The setting of the randomizer above referred to will be the same on all systems or apparatus employed by intercommunicating organizations. Each of a group of intercommunicating organizations has a duplicate set of punched or perforated cards, the cards in the set differing from one another in their perforations. A separate perforated card is employed for each message and each card preferably has an identifying combination of figures or letters, preferably in the form of a combination of two letters. Before a message is transmitted the message is handed to the clerk in charge of this apparatus together with a selected punched card which is employed in the sensing device and which, as set forth above, serves to vary the correspondence between each key and the translating devices with the result that the three-letter test indicated by the system is unique for the message being transcribed and is controlled by the then setting of the adjustable elements of the randomizer and by the specific punched card employed. The three-letter test obtained together with the two letters indicating the specific punched card employed is then transmitted as a part of the message, in the form of a five-letter group. Upon receipt of the message the correspondent bank employs the duplicate punched card in the system and similarly transcribes the message on the keyboard. If, then, the system and apparatus yield the same three-letter test, the correspondent bank is assured of the authenticity and accuracy of the message.

Having broadly described the invention, reference is now made to the accompanying drawings, and the following specification for a specific description of an embodiment of the invention, it being understood that specific embodiments shown herein may be varied in substantial respects.

Fig. 1 illustrates one embodiment of the invention;

Fig. 2 is a plan view of the register;

Fig. 3 is a side view of the register showing the housing for the electrical operating devices in section;

Fig. 4 is a side view of a modified form of registering device;

Fig. 5 is a plan view of the modified form of registering device;

Fig. 6 shows a modified form of randomizing system in which the initial randomizer is cylindrical, the cylindrical elements being shown in developed form;

Fig. 7 is a plan view of the cylindrical randomizer;

Fig. 8 is a vertical sectional view thereof; and

Fig. 9 is a plan view of one of the adjustable annular randomizer elements.

Fig. 1 which is a diagrammatic illustration of one embodiment of the invention will now be specifically described. In this figure reference character 10 designates a keyboard. If desired, this may be a typewriter keyboard in which case it may have twenty-six or thirty-six keys. It is preferred, however, to reduce the number of keys for the purpose of simplifying the apparatus. In the present case, therefore, ten such keys 11 are employed and each key corresponds to one of the ten digits from zero to 9 and in addition each key also corresponds to two or three letters of the alphabet and/or other characters. Each key operates a switch 12 individual thereto. This switch is preferably normally open and is temporarily closed by the key operation.

The reference character 13 designates an indicating or recording device which is operable by a series of electrically responsive motors such as electromagnets or solenoids 14, there being ten of these devices, corresponding to the number of character keys on the keyboard. The construction of the indicating or recording device 13 and the manner in which it is operated by the electromagnets or solenoids 14 will be more fully described in the later portion of this specification. For the present, it is sufficient to state that these electromagnets serve to operate a register cumulatively or in the manner in which a comptometer or other common type of adding machine is operated. The register preferably consists of two or three character wheels which are fractionally rotated by the successive operations of the electromagnets 14.

The randomizer 15 is electrically interposed between the keyboard 10 and the registering device 13. Ten wires 90 lead from the keyboard 10 to the randomizer and ten more wires 34 lead from the randomizer to the translating devices 14. This randomizer comprises a wiring system which renders potentially available a multiplicity of electrical paths between each of the switches 12 and several of the electromagnets 14 and also includes means for rendering only one such path available upon the depression of a key for energizing one electromagnet. It will, therefore, be apparent that the manner of operation of the register by the depression of a key is variable and that in the process of transcribing the test data of a message on the keyboard, the successive operations of the electromagnets will serve to accumulate an indication upon the register which is unique for the message being transcribed and which final indication cannot be predicted by the test clerk or operator, who is not in possession of all the controlling factors contributing to the determination of the final result herein termed the test.

For these purposes the randomizer may be considered as comprising a series of assembled units, each of which serves to vary the electrical path between the keyboard and the registering device, and the several units together serving to provide a great multiplicity of such paths and when operated in the manner described hereinbelow serve to render the test obtained by the apparatus for any particular message unique for that message. One such unit is indicated by the reference character 16 and is composed of two fixed commutator bars 17 and 18, a slidable bar 19 interposed between the fixed bars 17 and 18, this slidable bar being provided with an armature 20 which is operable by the electromagnet 21, and a removable and replaceable random connector plate 22. The fixed commutator bar 17 is provided with ten conducting segments which are insulated from each other and the fixed commutator bar 18 is provided with twenty conducting segments which are insulated from one another. The latter twenty segments are arranged in ten pairs, each pair corresponding to a single segment on the bar 17. The slidable bar 19 carries ten bridging elements 23 insulated from one another and is held in position indicated by the spring 24. It will be seen that as shown the bridging elements 23 serve to bridge each contact segment on the bar 17 with the odd segment on the commutator bar 18. When the bar 19, however, is drawn to the right by the action of electromagnet 21, then its bridging elements 23 establish connections between the segments on the fixed bar 17 and the corresponding even numbered segments on the fixed bar 18. Thus, one of two alternative sets of ten electrical paths between the contacts on the bar 17 and those on the bar 18, depending upon whether magnet 21 is energized or not, is available.

The random connector plate 22 is preferably made of insulating material and is provided on the lower face thereof with twenty insulated, preferably spring actuated, contacts 25 which are disposed against and in contact with the twenty segments of the bar 18. The plate 22 also has another set of ten similar contacts 26 on its opposite face, these being disposed against and in contact with the segments of the lower fixed bar of the next assembly unit. The ten contacts 26 are connected to the twenty contacts 25 at random by wires 27, each of the contacts 26 being connected to two contacts 25 in a random arrangement which can be varied at will. The only limitation upon these random connections between the contacts 26 and 25 is that the two wires leading from each of the contacts 26 should go one to an odd numbered contact 25 and the other to an even numbered contact 25.

An inspection of Fig. 1 will now show that the randomizer 15 comprises five assemblies each corresponding to the assembly 16 described immediately above. These assemblies are identical with each other except that the random connector plates each vary from the other. These plates 22 are removable and interchangeable. If desired, a plurality of such connector plates are made available. The cross connections in each of these plates differ from the cross connections in each of the remaining plates. Each of these assemblies comprises electromagnetic relays indicated by the reference characters 21, 31, 41, 51 and 61.

The ten connecting wires 90 leading from the ten switches 12 on the keyboard may, if desired, be connected directly to the ten segments on the lowermost commutator bar 17. It is preferred however, to connect the same to the contacts 28 on the fixed insulating bar 29 and a connector plate 30 is interposed between the bar 28 and the commutator bar 17. This connector plate 30 has ten contacts on the upper and lower faces thereof which may be variably cross-connected and this plate 30, like the random connector plates 22 is also removable and replaceable by another plate 30 which has a different set of cross connections between the contacts on its opposing faces.

The randomizer at its top and above the last unit is additionally provided with a fixed bar 32 having ten segments and another bar 33 having ten contacts on one face thereof and a connector plate 30' similar to plate 30, preferably having a different set of cross connections interposed between the bars 32 and 33. Wires 34 lead from the ten contacts on the bar 33 to the electromagnets in the register 13. If desired, the elements 30' and 33 may be eliminated and the wires 34 may be connected directly to the contacts on the bar 32. If desired several plates 30 and 30' may be held by each organization.

The magnets 21, 31, 41, 51, and 61 are under the control of a sensing mechanism generally designated 35 which in turn is controlled by a punched card 36. The punchings on this card may be arranged in any manner desired in accordance with a plural unit code but are preferably arranged to correspond with characters in the Baudot code. In Fig. 1 only a portion of card 36 is shown, it being deemed unnecessary to show a complete card with the large number of perforations thereon. For purposes of illustration five rows of perforations 9 are shown, each arranged transversely of the card and each row corresponding to a letter of the alphabet. In the specific card shown these five letters spell the words "we are", these being the first two words of a sentence or two which was employed in making up this card. By the use of this method of making up cards every bank or other organization using the present system may prepare its own set of cards from a list of words, phrases, or sentences issued by a central agency. In addition, at the extreme right and left of the card are perforations serving as feed holes 2 and 2' for stepping the card forward, as explained below.

The sensing mechanism comprises a set of brushes 37, and a contact plate 38, and means for feeding the card 36 between the brushes and the contact plate. The feeding means operate intermittently and are controlled by the stepping magnet 39, which is associated with toothed-wheels, not shown, the latter engaging the feed holes in card 36. Every time a key of the keyboard 10 is depressed, the contact 40, operated by a universal bar on the keyboard, is closed upon its release or back stroke. This serves to energize the card stepping magnet 39. Thus with each depression of any key, the card is stepped forward to the next position, thereby energizing one or more of the electromagnets 21, 31, 41, 51, 61, and shifting the corresponding bars 19. This establishes new electrical paths between the keyboard and the translating devices and the correspondence between the translating devices and the keys is radically altered. The switch 1 is a master control switch which must be closed in order to operate the apparatus.

Figs. 2 and 3 show one form of registering or recording device. In this form a common type of adding machine is employed in which each counter has its own set of keys and the operation of each key is transmitted directly to the counter so that the counters are operated cumulatively. This device is generally designated by the reference numeral 42 and for the purposes of the present system only three registers are employed and they are displayed through the openings 43. Only two sets of five keys 44 are employed. The mechanism is provided with a clearing device operated by the handle 45.

A casing 46 having ten solenoids superposed over the keys, is mounted in the manner shown in Fig. 3. The counter wheels 47 may bear digits from zero to 9 on their peripheral cylindrical faces as is common in such adding machines. It is preferred, however, to have each of these wheels bear the twenty-six letters of the alphabet. These wheels are herein broadly termed "character" wheels.

Figs. 4 and 5 show a modified form of registering device. In this form three wheels 48, 481, and 482 each bearing the letters of the alphabet are so disposed that the two outside wheels 481 and 482 are operated by ten solenoids arranged in two groups, 49 and 491, and a complete revolution of either wheel is transmitted to the intermediate wheel 48. Each group of five solenoids is associated with its segment lever, the solenoids being so disposed that the solenoid furthest from the fulcrum 52 of the lever serves to advance the wheel one step or space, the one next to it two spaces, etc. For this purpose, the plunger 53 of each solenoid has a stop collar 54 which limits the movement of each plunger, as shown. The segment lever 50 is geared to rotary member 55 which turns freely on the shaft 56 of the character wheels. The member 55 carries a pawl 57 cooperating with a ratchet 58 on the adjacent wheel.

A trusted officer of the bank or office employing the present system is given exclusive access to the randomizer which is preferably disposed in a locked case as indicated by the dotted square 59. He also has in his exclusive possession a large number of random connector plates 22 which vary from each other. All such officers have in their possession a document setting forth the arrangement of these plates in the randomizer, which is changed from time to time, as from day to day or week to week. Where the removable and interchangeable plates 30 and 30' are employed, the same document will give similar instructions about these plates. The randomizers in each of a group of communicating offices, therefore, all have the same initial settings for each such period. The same or another officer of each bank has in his possession a set of punched cards, these cards differing from each other in each set, these sets being duplicates of each other. Each card is identified by a combination of two letters of the alphabet.

When a message is to be transmitted to a correspondent bank, the message together with a punched card is handed to the test clerk. The latter inserts the card in the sensing mechanism and then transcribes the test data of the message on the keyboard 10. It will now be understood that as this transcription proceeds, the operation of the character wheels in response to the operation of the keys 11 will vary at each such operation. This variation depends upon the specific set of random connector plates 22 in the randomizer and their specific arrangement, which render potentially available a plurality of electrical paths from the keyboard 10 to the registering device 13 for each key 11. The sensing mechanism controlled by the punched card then selects a single path from a multiplicity of available paths for each key. These operations of the character wheels are cumulative with the result that when the test data of the message are transcribed, the character wheels indicate a combination of three letters or three digits, as the case may be, which combination is a summation peculiar and individual to this particular message and constitutes the test for the message. The message is then transmitted together with a five-letter group consisting of the two letters which identify the card and the three letters which constitute the test for this message. When the correspondent bank receives the message, the card indicated in the message is selected and handed to the test clerk with the message. The test clerk then transcribes the test data of the message as described and if the message is authentic, he should obtain the same three-letter or three-digit test as that which appeared in the message.

Figs. 6, 7, 8, and 9 show a modified form of the randomizer. In this construction the randomizer is cylindrical and Fig. 6 shows a developed view of the cylindrical elements. The cylindrical randomizer comprises five annular random connectors 221 which correspond in function to the random connector plates 22 of Fig. 1. These annular elements are rotatable on the shaft 92 and each may be set to any one of ten positions with respect to the vertical line 91 on the fixed parts of the randomizer. The number of settings made available by this randomizer is so great that it becomes unnecessary to remove or replace these elements, but one set of such elements becomes sufficient. At the bottom of the cylinder and interposed between each pair of elements is a fixed annular element 171 of insulating material and having ten conducting segments on one edge and twenty conducting segments on the opposite edge. These elements 171 combine the function of the elements 17 and 18 of Fig. 1. The lowest element 171 has twenty contacts cooperating with the corresponding spring contacts of the adjacent random connector 221, and is also provided with a receptacle 62 having ten sockets and adapted to receive the plug 63 having ten contacts. The ten wires from the plug 63 lead to the keyboard 10. Similarly at the top of the randomizer is a fixed annular element 331 having ten contacts cooperating with the contacts of the uppermost rotatable element 221. The element 331 is also provided with a receptacle 64 adapted to receive the plug 65 having ten contacts leading from the ten electromagnets or solenoids 14 of register 13.

If desired the plugs and sockets 62—63 and 64—65 may be arranged circularly so that each plug may be inserted in any one of ten positions, thereby offering further adjustments.

Wires 66 lead from each of the group of ten contacts on the elements 171 to a corresponding bank of contacts 67 which are normally in contact with the upper contacts 68 and are movable as a bank by the electromagnet 21, 31, 41, 51, or 61, as the case may be, to contact with the lower contacts 69. Wires 70 lead from the contacts 68 and 69 to the group of twenty contacts on the opposite edge of the element 171.

The electromagnets 21, 31, 41, 51, and 61 are the same as those shown in Fig. 1 and are similarly controlled by the sensing mechanism.

The rotatable elements 221 are carried by spiders 71 and the hub is provided with a spring pressed detent 72 which cooperates with the ten depressions 73 in each of the collars 74 which are fixed on the shaft, thereby holding the same in the adjusted position. The elements 221 are preferably provided with the numerals 1 to 10 circumferentially thereon by which they may be set to any desired position, with reference to line 91 on each of the elements 171.

I claim:

1. In combination a set of character elements constituting a keyboard, an electric switch individual to each element and operable thereby, a corresponding number of electric responsive devices operable by said elements, a smaller number of character indicators cumulatively operable by said devices, and a wiring system electrically connected between said switches and said devices providing a multiplicity of potentially available electrical paths for the passage of electric current between said switches and said devices, said wiring system comprising variably adjustable members to select a group of said paths.

2. In combination a set of character elements constituting a keyboard, an electric switch individual to each element and operable thereby, a corresponding number of electric responsive devices operable by said elements, a smaller number of character indicators cumulatively operable by said devices, a wiring system electrically connected between said switches and said devices providing a multiplicity of potentially available electrical paths for the passage of electric current between said switches and said devices, and means operable in response to each key operation for selecting a group of said paths.

3. The combination set forth in the preceding claim in which the last named means comprises a variably operable sensing mechanism.

4. The combination set forth in claim 2 in which the last named means comprises a sensing mechanism operable in accordance with a plural unit code.

5. In combination a group of manually operable character keys, a rotatable character wheel, means for translating a key operation into a fractional rotation of the wheel, and a randomizer controlling the operation of said translating means to vary the angular displacement of said wheel consequent upon operation of a key.

6. In combination a group of manually operable character keys, a rotatable character wheel, means for translating a key operation into a fractional rotation of the wheel, and a randomizer controlling the operation of said translating means to vary the angular displacement of said wheel consequent upon operation of a key, said randomizer comprising variably adjustable devices to vary the setting thereof.

7. In combination a group of manually operable character keys, a rotatable character wheel, means for translating a key operation into a fractional rotation of the wheel, and a randomizer controlling the operation of said translating means to vary the angular displacement of said wheel consequent upon the operation of a key, said randomizer comprising means responsive to each key operation to vary the operation thereof.

8 In combination a group of manually operable character keys, a rotatable character wheel, means for translating a key operation into a fractional rotation of the wheel, and a randomizer controlling the operation of said translating means to vary the angular displacement of said wheel consequent upon the operation of a key, said randomizer comprising a series of devices adjustable at will, and means cooperating therewith responsive to each key operation to vary the operation thereof.

9. In combination a group of manually operable keys, a rotatable character wheel, a plurality of electrical devices operatively associated with said wheel, each device being operable to impart to said wheel a distinctive angular displacement, and electrical means operatively interposed between said keys and said devices for associating any one of a plurality of said devices with any one of said keys and to render the device responsive to the operation of the key.

10. In combination a group of manually operable keys, a rotatable character wheel, a plurality of electrical devices operatively associated with said wheel, each device being operable to impart to said wheel a distinctive angular displacement, and electrical means operatively interposed between said keys and said devices for associating any one of a plurality of said devices with any one of said keys and to render the device responsive to the operation of the key, said last named means comprising variable electrical connections between said keys and said devices.

11. In combination a group of manually operable keys, a rotatable character wheel, a plurality of electrical devices operatively associated with said wheel, each device being operable to impart to said wheel a distinctive angular displacement, and electrical means operatively interposed between said keys and said devices for associating any one of a plurality of said devices with any one of said keys and to render the device responsive to the operation of the key, said last named means comprising variable electrical connections between said keys and said devices and means responsive to each key operation for further varying such electrical connections.

12. In combination a keyboard, an electrical switch associated with each key and operable thereby, a group of electromagnetic devices, corresponding in number to the number of keys on the keyboard, electrical wiring means connecting said switches to said devices, said means comprising a randomizer for varying the correspondence between said devices and said switches, and rotatable character wheels cumulatively operable by said devices.

13. The combination set forth in claim 12 in which the number of character wheels is less than the number of keys.

14. An electrical system comprising a bank of electrical devices, and a bank of manually operable electric switches controlling the devices, in combination with a wiring system electrically connected between said devices and said switches, said wiring system comprising a plurality of independently movable random connectors whereby the correspondence between said devices and said switches may be varied at will and at random, and character indicators cumulatively operable by said devices.

15. An electrical system comprising a bank of electrical devices, and a bank of manually operable electric switches corresponding in number to the number of said devices, in combination with a wiring system electrically connected between said switches and said devices establishing electrical circuits between each switch and only one of said devices at a time, said wiring system comprising movable random connections whereby the correspondence between said devices and said switches may be varied at random, and a group of character indicators fewer in number than the number of said devices cumulatively operable by said devices.

16. An electrical system comprising a bank of electrical devices, and a bank of manually operable electric switches corresponding in number to the number of said devices, in combination with a wiring system electrically connected between said switches and said devices establishing electrical circuits between each switch and only one of said devices at a time, said wiring system comprising movable connections and means responsive to the operation of any of said switches to vary the correspondence between said devices and said switches, and a group of character indicators cumulatively operable by said devices.

17. A device for obtaining an authenticating test for a message, comprising a keyboard comprising character elements, a plurality of cumulatively operable character wheels, and variably operable means interposed between said keyboard and said wheels whereby the correspondence between the operation of said keys and the operation of said character wheels may be varied.

18. A device for obtaining an authenticating test for a message, comprising a keyboard comprising character elements, a plurality of cumulatively operable character indicating means, and means interposed between said keyboard and said indicating means for varying at every key operation the correspondence between the operation of said keys and the operation of said character indicating means.

19. The device set forth in claim 18 in which the last named means comprises several groups of contacts, each group corresponding in number to the number of keys, each contact having a corresponding pair of contacts for alternate connection therewith, and an operating device for each such group.

20. The device set forth in claim 18 in which the last named means comprises a plurality of relays, the same being selectively operable singly or in groups under the control of a test-individualizing element.

21. The device set forth in claim 18 in which the last named means comprises a plurality of relays, the same being selectively operable singly or in groups under the control of a test-individualizing element which bears perforations permuted in accordance with a plural unit code.

22. A device for obtaining an authenticating test for a message, comprising a keyboard comprising character elements, a plurality of cumulatively operable character indicating means, and means interposed between said keyboard and said indicating means for varying at will the correspondence between the operation of said keys and the operation of said character indicating means.

23. A device for obtaining an authenticating test for a message, comprising a keyboard comprising character elements, a plurality of cumulatively operable character indicating means, and means interposed between said keyboard and said indicating means for varying the correspondence between the operation of said keys and the operation of said character indicating means, said last named means comprising elements operable at will and elements operable in response to each key operation.

24. A device for obtaining an authenticating test for a message, comprising a keyboard comprising character elements, a plurality of cumulatively operable character indicating means, and a first order randomizer interposed between said keyboard and said character indicating means, said randomizer having elements which may be set to vary the correspondence between said keys and the operation of said character indicating means, and a second order randomizer operable in response to each key operation.

25. The device set forth in claim 24 in which the first order randomizer comprises a set of contacts corresponding in number to the number of keys on the keyboard, a second set of contacts having twice the number of contacts in the first set, and a removable plate having two sets of contacts to correspond with said first mentioned two sets of contacts and also having random cross connections between said two sets of contacts.

26. The device set forth in claim 24 in which the first order randomizer comprises a circularly arranged set of contacts the same in number as the keys on the keyboard, a second set of circularly arranged contacts twice in number, and an annular element interposed between said sets of contacts and adjustable to any one of a plurality of positions to vary the connections from said first set of contacts to said second set of contacts.

27. A device for obtaining an authenticating test for a message, comprising a keyboard, a plurality of cumulatively operable character indicators, and means operatively interposed between said keyboard and said character indicators whereby the operation of keys on the keyboard will result in an indeterminate operation of said character indicators, said means comprising a plurality of operative units, each unit comprising: a set of contacts equal in number to the number of keys on the keyboard, a pair of alternate contacts for each of said contacts and a relay for shifting said first mentioned contacts from one of each pair of alternate contacts to the other.

28. The device set forth in claim 27 having means for operating said relays singly or in groups in response to each key operation.

29. The device set forth in claim 27 having means for operating said relays singly or in groups in response to each key operation, said last named means comprising a test-individualizing element controlling the operation of said relays.

30. The device set forth in claim 27 having means for operating said relays singly or in groups in response to each key operation, said last named means comprising an electrical sensing mechanism adapted to be controlled by a perforated test-individualizing element.

31. In combination a set of character elements constituting a keyboard, an electric switch individual to each element and operable thereby, a corresponding number of electric responsive devices operable by said elements, a wiring system electrically connected between said switches and said devices rendering available a multiplicity of electrical paths between said switches and said devices whereby each switch may become associated with any one of a plurality of said devices, said system comprising adjustably movable connectors whereby the wiring system may be given an initial setting providing one electrical path for each switch, means operable in response to each key operation for changing such setting, and a plurality of character indicators cumulatively operable by said devices.

32. The combination set forth in claim 31 in which the last named means comprises a sensing mechanism operable by a perforated element.

33. The combination set forth in claim 31 in which the last named means comprises a plurality of relays corresponding in number to the number of movable connectors, and a sensing mechanism operable by an element perforated in accordance with a plural unit character code.

34. In combination a set of character elements constituting a keyboard, an electric switch individual to each element and operable thereby, a corresponding number of electric responsive devices operable by said elements, a smaller number of character wheels operable by said devices, a wiring system electrically connected between said switches and said devices providing a multiplicity of potentially available electrical paths for the passage of electric current between said switches and said devices whereby each switch may become associated with any one of a plurality of said devices, said system comprising a plurality of stationary annular commutator elements and rotatable annular commutator members interposed between each pair of fixed commutator elements, said members having a set of contacts on each face thereof, cooperating with the contacts of the adjacent stationary element, said members also having random cross connections between the contacts on the opposing faces thereof, whereby the wiring system may be given an initial setting at will, and means operable in response to each key operation for changing such setting.

35. The combination set forth in claim 34 in which the last-named means comprises a sensing mechanism operable by a perforated card.

36. The combination set forth in claim 34 in which the last-named means comprises a sensing mechanism operable by a perforated card bearing perforations permuted in accordance with a plural unit code.

37. A system for obtaining an authenticating test in the form of a limited number of characters for message data, said system comprising a set of character elements constituting a keyboard, an electric switch individual to each element and operable thereby, devices operable in response to the operation of said switches, and a limited number of character indicator means operable by said devices, whereby spelling out the message on the keyboard will result in an indication of a limited number of characters constituting a test for the message data.

38. A system for obtaining an authenticating test in the form of a limited number of characters for message data, said system comprising a set of character elements constituting a keyboard, an electric switch individual to each element and operable thereby, devices operable in response to the operation of said switches, means for varying the correspondence of operation between said devices and said switches, and a limited number of character indicator means operable by said devices, whereby spelling out the message on the keyboard will result in an indication of a limited number of characters constituting a test for the message data.

39. A system for obtaining an authenticating test in the form of a limited number of characters for message data, said system comprising a set of character elements constituting a keyboard, an electric switch individual to each element and operable thereby, devices operable in response to the operation of said switches, means operable in response to each key operation for varying the correspondence of operation between said devices and said switches, and a limited number of character indicator means operable by said devices whereby spelling out the message on the keyboard will result in an indication of a limited number of characters constituting a test for the message data.

40. A system for obtaining an authenticating test in the form of a limited number of characters for message data, said system comprising a set of character elements constituting a keyboard, an electric switch individual to each element and operable thereby, devices operable in response to the operation of said switches, means operable in response to each key operation for varying the correspondence of operation between said devices and said switches, and comprising a sensing mechanism operable by a perforated element, and a limited number of character indicator means operable by said devices whereby spelling out the message on the keyboard will result in an indication of a limited number of characters constituting a test for the message data.

41. A system for obtaining an authenticating test in the form of a limited number of characters for message data, said system comprising operating means for spelling out the message data, a limited number of character indicating means, and devices operatively interposed between said operating means and said indicating means, said devices being operable in response to said operating means and also serving to cause the indicating means to indicate a limited number of characters constituting a test for the message data.

42. A system for obtaining an authenticating test in the form of a limited number of characters for message data, said system comprising operating means for spelling out the message, a limited number of character indicating means, devices operatively interposed between said operating means and said indicating means, said devices being operable in response to said operating means and serving to cause the indicating means to indicate a limited number of characters constituting a test for the message data, and means for varying the correspondence of operation between said devices and said operating means.

43. A system for obtaining an authenticating test in the form of a limited number of characters for message data, said system comprising operating means for spelling out the message, a limited number of character indicating means, devices operatively interposed between said operating means and said indicating means, said devices being operable in response to said operating means and serving to cause the indicating means to indicate a limited number of characters constituting a test for the message data, and means for varying the correspondence of operation between said devices and said operating means, said last named means comprising a sensing mechanism operable by a perforated element.

WILLIAM F. FRIEDMAN.